United States Patent [19]

Francioni

[11] Patent Number: 4,995,813

[45] Date of Patent: Feb. 26, 1991

[54] SYSTEM OF ELEMENTS FOR THE CREATION OF GRAPHIC COMPOSITIONS

[76] Inventor: Corrado Francioni, Via Stendha 7/A, 40128 Bologna, Italy

[21] Appl. No.: 362,101

[22] Filed: Jun. 6, 1989

[30] Foreign Application Priority Data

Jun. 9, 1988 [IT] Italy ................................ 3499 A/88

[51] Int. Cl.[5] .............................................. G09B 19/00

[52] U.S. Cl. ......................................... 434/96; 434/98; 434/259; 434/407; 273/157 R

[58] Field of Search ...................... 434/96, 98, 81, 258, 434/259, 407; 40/618; 273/153 R, 157 R

[56] References Cited

U.S. PATENT DOCUMENTS

| | | | |
|---|---|---|---|
| 191,167 | 5/1877 | Mueller | 434/98 |
| 1,573,358 | 2/1926 | Ross | 434/407 |
| 2,327,471 | 8/1943 | Tiers | 40/618 X |
| 2,534,550 | 12/1950 | Frechtmann | 273/157 R |
| 3,759,522 | 9/1973 | Hodan, III | 273/157 R |
| 4,307,886 | 12/1981 | Kemper | 273/157 R |
| 4,725,061 | 2/1988 | Gross | 273/157 R |

FOREIGN PATENT DOCUMENTS

| | | | |
|---|---|---|---|
| 189876 | 12/1922 | United Kingdom | 434/96 |

*Primary Examiner*—V. Millin
*Assistant Examiner*—Jennifer L. Doyle
*Attorney, Agent, or Firm*—Banner, Birch, McKie & Beckett

[57] ABSTRACT

The system consists of a board with sockets and an assortment of tetrahedral pegs having a regular obverse face and a reverse side in the form of a triangular shank that inserts to a matching fit in one of the sockets. When the pegs are inserted into the board or first element the adjacent faces of the pegs make contact so that no gaps exist between adjoining edges. Each of the faces, or a part of each face, if divided into more than one field, is uniformly tinted in one of a set of repeatable colors or polychrome or monochrome shadings.

11 Claims, 2 Drawing Sheets

FIG 1
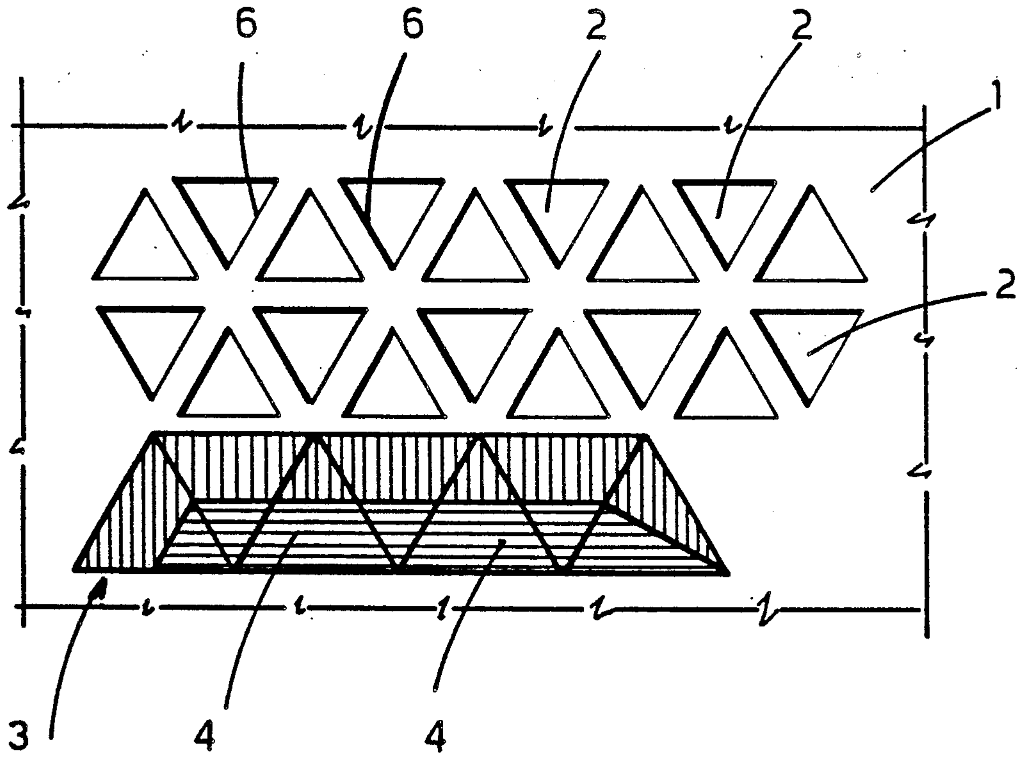
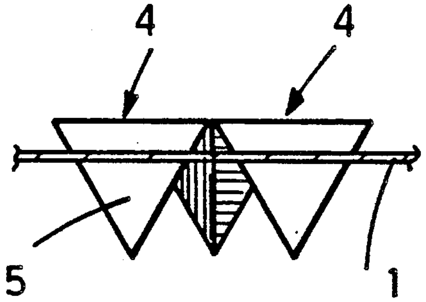
FIG 2
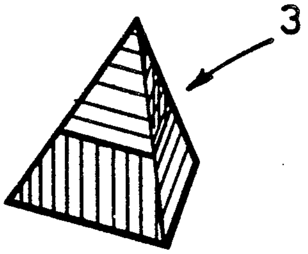
FIG 3
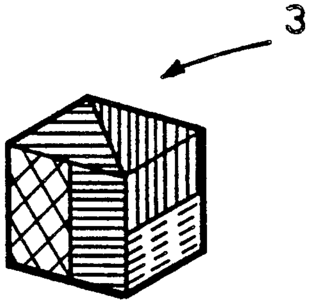
FIG 5

SYSTEM OF ELEMENTS FOR THE CREATION OF GRAPHIC COMPOSITIONS

BACKGROUND OF THE INVENTION

The invention relates to a system of elements used in creating graphic compositions.

The prior art embraces graphics composition systems consisting of a perforated surface, or board, and a plurality of pins, or pegs, insertable in the holes of the board.

The holes are set close to one another, positioned in such a way that the heads of the inserted pegs are brought into contact one with another.

Thus, using pegs with heads in a variety of colors, it becomes possible to insert the pegs selectively into the holes by their shanks, in such a way that the heads create a graphic composition resembling mosaic.

The main drawback with such a system of elements is that the surface of a finished composition appears irregular and lacks continuity.

Accordingly, the object of the present invention is to provide a system unaffected by the drawback in question.

SUMMARY OF THE INVENTION

The stated object is realized with a system of elements for the creation of graphic compositions according to the invention.

Such a system comprises a first element, or board, affording sockets in which to insert the matching shanks of second elements, each having a regular polygonal flat face disposed normal to the axis of the shank. The distance between adjacent sockets is such that the polygonal faces of the inserted second elements lie in full contact one with the next by way of their corresponding respective sides, with no gaps remaining.

BRIEF DESCRIPTION OF THE DRAWINGS

The invention will now be described in detail, by way of example, with the aid of the accompanying drawings, in which:

FIGS. 1 and 2 show a plan and a side elevation, respectively, of certain elements of the system according to the invention;

FIG. 3 shows a perspective of one of the elements illustrated in FIGS. 1 and 2;

FIG. 5 is the perspective of a further element of the system disclosed.

DESCRIPTION OF THE PREFERRED EMBODIMENTS

Figure 4:
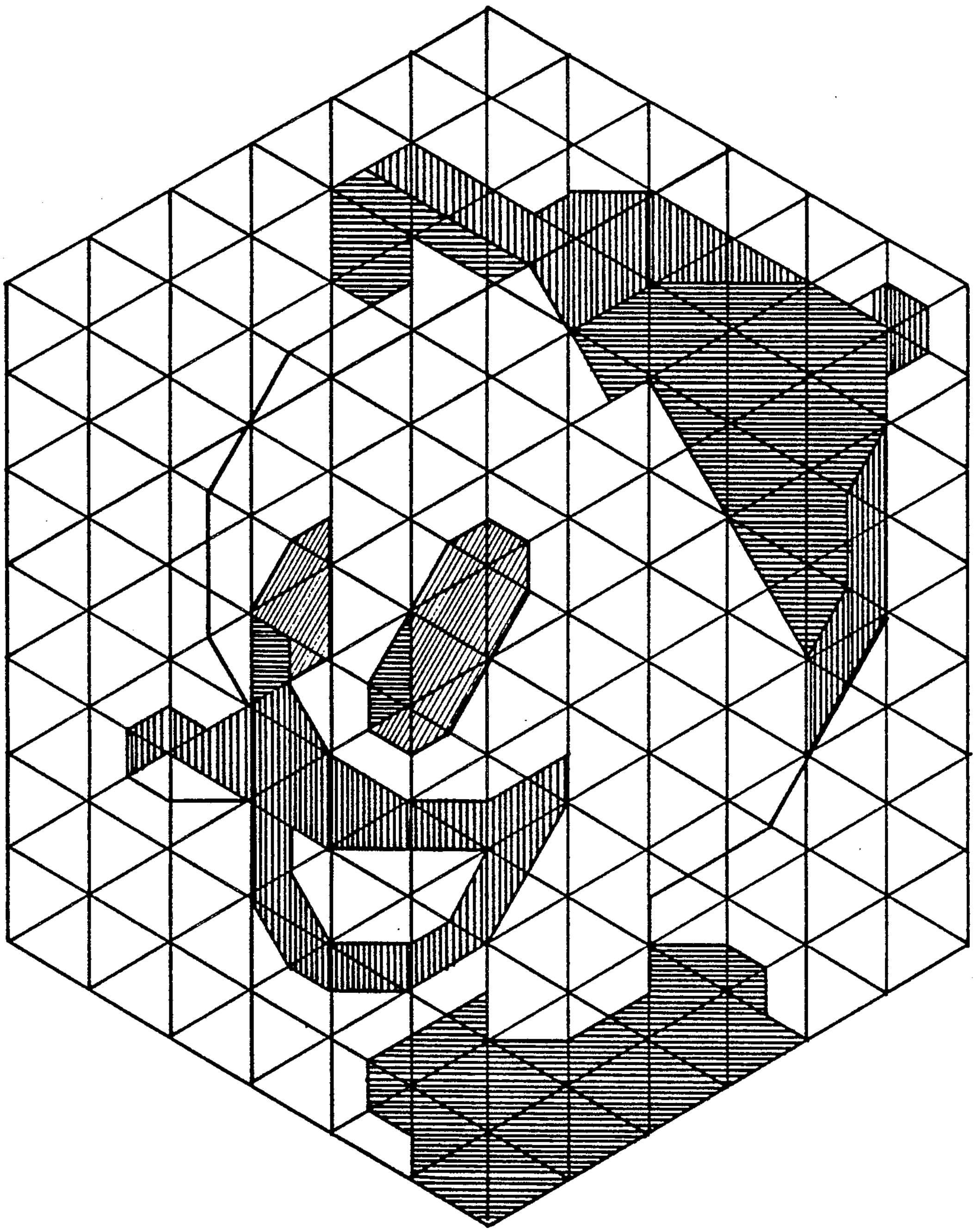
FIG. 4 illustrates a possible graphic composition obtainable with the system of elements according to the invention.

With reference to FIG. 1, the system of elements according to the invention consists essentially in a first element, or board 1, and a plurality of second elements 3.

The second elements 3 are embodied each with one flat face 4 of regular polygonal shape, and on the reverse of the flat face, a shank 5 insertable in one of a plurality of sockets 2 formed in the top surface of the board 1.

The shank 5 might be cylindrical in embodiment. Alternatively, the cross section of the shank might be geometrically similar to the flat face 4, and of proportionately reduced dimensions, needless to say; for example, the element 3 might be embodied as a pyramid the base of which coincides with the flat face 4.

In a preferred embodiment of the invention, each element 3 appears as a regular tetrahedron, the flat face 4 coinciding with any one of the four tetrahedral faces, and the shank 5 coinciding with the tetrahedral solid in its entirety.

The flat face 4 is uniformly tinted in one of a selected range of colors, or poly- or monochrome shadings, and might be divided up into two or more fields of which the dimensions of the sides that coincide with the sides of the relative flat face 4 may be either equal to or submultiples of the dimensions of those sides.

With reference in particular to FIGS. 1 and 2, the board 1 affords a plurality of sockets 2 exhibiting equilateral triangular sections, and a plurality of second elements 3 embodied as regular tetrahedrons.

The adjacent edges 6 of adjoining sockets 2 are disposed parallel and set apart one from the other at a perpendicular distance equal to twice the distance by which the corresponding side of a flat face 4 projects beyond the edge when the relative second element is inserted in the socket (FIG. 2).

Thus, the flat faces 4 of the second elements 3 are brought fully into contact one with the next by way of their adjoining sides, in such a way that no gaps remain between them.

In the example of FIG. 3, which shows an element 3 of regular tetrahedral embodiment in accordance with the foregoing description, each face 4 is divided into two fields by a straight line either lying parallel to one side and intersecting the two remaining sides at midpoint, or bisecting one of the angles.

Each field of the flat face 4 divided in this way is uniformly colored or shaded as aforementioned, and the coloring or shading of the two fields is dissimilar.

It will be clear enough that a regular tetrahedral shape as disclosed provides considerable savings in material, since each element 3 has four different flat faces 4, any one of which can be used in the creation of a selected graphic composition.

FIG. 5 illustrates an alternative embodiment of the invention, in which the second elements 3 might be cubes insertable in the single recess of a board 1, or otherwise supported, offered one to the next in full frontal contact with no gaps remaining, and colored in the manner described above. In this type of embodiment, multicolored faces may be divided by one of the two diagonals, or a line parallel thereto, or by a line parallel with one side.

What is claimed is:

1. A system of elements for the creation of graphic compositions, comprising:

a first element affording a plurality of sockets arranged horizontally and a plurality of sockets arranged vertically;

a plurality of second elements provided obversely with a flat face of regular polygon-shape, said polygon-shape defining sides of the face, and reversely with a shank insertable individually in a matching fit in the sockets of the first elements, at least one of said second elements exhibits a flat face uniformly tinted in one of a select range of colors, or of polychrome or monochrome shadings, and wherein at least one other second element exhibits a flat face divided into at least two fields, each of which are uniformly tinted in a color or shading of the same range;

wherein the sockets are arranged to match the geometry of the flat faces and set apart one from the next at a distance such that when the second elements are inserted into the sockets by way of their shanks, the flat faces are brought fully into contact one with the other so that the respective sides are adjoining, with no gaps remaining between them.

2. A system of elements as in claim 1, wherein the shank of the second element exhibits a polygonal cross section geometrically similar to the flat face.

3. A system of elements as in claim 1, wherein the second element is embodied as a pyramid of which the base coincides with the flat face.

4. A system of elements as in claim 1, wherein the second element is a regular tetrahedron of which any one of the four faces coincides with the flat face.

5. A system of elements as in claim 4, wherein the four faces are chromatically dissimilar.

6. A system of elements as in claim 1, wherein at least some of the flat faces are divided into at least two fields of which the dimensions of the sides coinciding with the sides of the flat face are equal to or sub-multiples of the dimensions of the sides of the flat face.

7. A system of elements as in claim 1, wherein said sockets are shaped as equilateral triangles and said second elements are shaped as regular tetrahedrons and wherein adjacent edges of adjoining sockets are disposed parallel and set apart one from the other at a perpendicular distance equal to twice the distance by which the corresponding side of a flat face projects beyond the edge when the relative second element is inserted in the socket.

8. A system of elements for the creation of graphic compositions, comprising a first element or board affording a plurality of sockets exhibiting equilateral triangular section, and a plurality of second elements embodied as regular tetrahedrons;

wherein the adjacent edges of adjoining sockets are disposed parallel and set apart one from the other at a perpendicular distance equal to twice the distance by which the corresponding side of a flat face projects beyond the edge when the relative second element is inserted in the socket, in such a way that the flat faces of the second elements are brought fully into contact one with the next by way of their adjoining sides, and no gaps remain; and wherein at least certain of the second elements exhibit a flat face uniformly tinted in one of a selected range of colors, or polychrome or monochrome shadings, whereas the remainder exhibit a flat face divided into at least two fields, each uniformly tinted in a color or shading of the same range, which are divided by a line parallel to one side of the flat face and intersecting the two remaining sides at mid-point, or by a line that bisects one of its vertices.

9. A system of elements for the creation of graphic compositions, comprising:

a first element affording a plurality of sockets;

a plurality of pyramid shaped second elements provided obversely with a flat face which corresponds to the base of said pyramid shaped with said face being of regular polygon-shape, said polygon-shape defining sides of the face, and reversely with a shank insertable to a matching fit in the sockets of the first element, at least one of said second elements exhibits a flat face uniformly tinted in one of a select range of colors, or of polychrome or monochrome shadings and wherein at least one other second element exhibits a flat face divided into at least two fields, each of which are uniformly tinted in a color or shading of the same range;

wherein the sockets are arranged to match the geometry of the flat faces and set apart one from the next at a distance such that when the second elements are inserted into the sockets by way of their shanks, the flat faces are brought fully into contact one with the other so that the respective sides are adjoining, with no gaps remaining between them.

10. A system of elements for the creation of graphic compositions, comprising:

a first element affording a plurality of sockets;

a plurality of second elements shaped as regular tetrahedrons with four faces with one of said faces being provided obversely with a flat face of regular polygon-shape, said polygon-shape defining sides of the flat face, and reversely with a shank insertable to a matching fit in the sockets of the first element, at least one of said second elements exhibits a flat face uniformly tinted in one of a select range of colors, or of polychrome or monochrome shadings and wherein at least one other second element exhibits a flat face divided into at least two fields, each of which are uniformly tinted in a color or shading of the same range;

wherein the sockets are arranged to match the geometry of the flat faces and set apart one from the next at a distance such that when the second elements are inserted into the sockets by way of their shanks, the flat faces are brought fully into contact one with the other so that the respective sides are adjoining, with no gaps remaining between them.

11. The system of elements as set forth in claim 10, wherein the four faces are chromatically dissimilar.

* * * * *